United States Patent [19]

Simon et al.

[11] 4,301,181

[45] Nov. 17, 1981

[54] PROCESS FOR PRODUCING A FISH PRODUCT

[75] Inventors: Frank J. Simon, San Marcos; William C. Reinke, Delmar, both of Calif.; Hong-Ming Soo, Crestwood, Mo.; Mary Kienstra, Florissant, Md.; Stanley H. Richert, Webster Groves, Mo.

[73] Assignee: Ralston Purina Company, St. Louis, Mo.

[21] Appl. No.: 160,694

[22] Filed: Jun. 18, 1980

[51] Int. Cl.³ .................... A23L 1/275; A23L 1/277; A23L 1/325

[52] U.S. Cl. .................................. 426/250; 426/261; 426/643; 426/513; 426/517

[58] Field of Search .............. 426/250, 261, 643, 652, 426/513, 517

[56] References Cited

U.S. PATENT DOCUMENTS

| 1,608,832 | 11/1926 | Birdseye | 426/643 |
| 2,827,383 | 3/1958 | Gorton, Jr. | 426/282 |
| 3,493,391 | 2/1970 | Pottie | 426/643 |
| 3,579,359 | 5/1971 | Schjolberg | 426/513 |
| 3,852,505 | 12/1974 | Rubin | 426/513 X |
| 3,863,017 | 1/1975 | Yueh | 426/643 |
| 4,060,644 | 11/1977 | Braid | 426/643 X |
| 4,136,204 | 1/1979 | Hughes et al. | 426/643 X |

FOREIGN PATENT DOCUMENTS 1240497 7/1971 United Kingdom ............... 426/643

Primary Examiner—Robert A. Yoncoskie
Attorney, Agent, or Firm—Joseph M. Hageman

[57] ABSTRACT

Red or dark meat portions of whole fish are restructured and preferably combined with light meat fillets or loins to produce a palatable, nutritious fish product. The process comprises comminuting the red meat, trim, carcass and skin of the fish to form a minced meat mass that is colored with a heat stable dye to resemble the natural color of tuna and subjected to plastic flow at temperatures of about 70° C. to about 90° C. and hen decolored and dewatered to form a restructured product which after retort cooking, has the chewy texture, aroma, color and flavor of the more desirable loin or fillet portions of the fish. The restructured product may be combined with cooked loins or fillets to produce a product which closely resembles 100% loins or fillets.

16 Claims, No Drawings

PROCESS FOR PRODUCING A FISH PRODUCT

BACKGROUND OF THE INVENTION

This invention relates to restructured fish product and more particularly, to a method of producing a fish product that utilizes about 50% to about 60% by weight of the whole fish.

A substantial portion of the available protein in fish is discarded during processing and used as animal feedstuff or fertilizer. The portion of the fish that is utilized in animal feedstuffs comprises red meat, trimmings, including tails, carcasses and skin, etc., which normally aren't acceptable in terms of appearance as an ingredient in human foods. The unacceptability of certain portions of fish for human consumption leads to processing inefficiencies and a void in filling the nutritional needs of individuals.

Efforts have been made to produce acceptable products for human consumption from the red or dark meat portions of fish. British Pat. No. 1,108,188 shows the extraction of fish protein by treating fish for two hours at a pH of about 13 and a temperature of 50° C., and after purification, the solution is deodorized with a peroxide solution having a concentration of 0.015% by weight, and a pH of 8.5, at a temperature of 80°C., for two hours. U.S. Pat. Nos. 4,060,644 and 4,136,204 show the bleaching of undissolved fish skeletal meat with a dilute aqueous solution of hydrogen peroxide and up to 10% by weight polyphosphate, preferably sodium tripolyphosphate at a pH of 10.5 to 11.5. The hydrogen peroxide is removed with catalase at a pH of 7.5 to 8.0. The pH of the bleached fish is then lowered to 6 to 7 by being washed with a food acid. There is no indication of improved texture of this product particularly when combined with light colored fish meat.

In British Pat. No. 1,400,876, the use of hydrogen peroxide to decolorize fish flesh at a pH of not more than 9.5 and at a temperature of between 30° and 70° C., is shown. Trash fish flesh is mixed with aqueous sodium hydroxide and heated to 50° C. The disclosure states the protein recovered from solution is unsuitable as a substitute or filler for animal proteins for human consumption because of inadequate nutritional quality. A protein isolate is prepared in U.S. Pat. No. 3,879,370 which is decolorized by hydrogen peroxide and deodorized by extraction with isopropanol. The nutritional value of the white isolate powder is adequate but it has undesirable texture for a restructured meat product.

The present invention relates to a process and product wherein substantially decolored dark meat from fish is restructured and combined with light meat from fish to provide a palatable, nutritious fish product utilizing up to about 50% to about 60% by weight whole fish.

SUMMARY OF THE INVENTION

The present invention comprises a process for decolorizing and restructuring red or dark meat of fish so that it resembles the white or light meat fillet or loin portions of fish. The dark meat is colored with a heat stable dye to produce the natural color of the fish after retorting, restructured, heat set and decolorized by treatment with hydrogen peroxide and optionally blended in proportions of 40% to 80% by weight with the light meat loin portions of the fish. The decolored meat resembles the light meat in fiber length, texture, flavor and color so the resultant product appears to be substantially 100% loin meat.

It is an object of the present invention to decolor and restructure the dark or red meat portions of fish.

Another object is to prepare a nutritious decolored meat product similar in appearance to light colored loin portions of fish.

And yet, another object of the present invention is to prepare a decolored, restructured meat product which can be combined with loin portions of the fish in a ratio of about 40 to 80% by weight so that about 60% of the whole fish may be utilized as a human food source.

DETAILED DISCUSSION

Substantially all portions of fish may be utilized efficiently and economically in the process of the present invention to provide a fish product acceptable and palatable to human tastes. Although there are many types of fish processed and used commercially, this invention was conceived and developed largely for the decoloring and restructuring of red or dark meat found in tuna and tuna-like species which include, but is not limited to, skipjack, yellowfin, albacore, bonito, blue fin, big eye, yellowtail, mackerel, etc. The utilization of fish according to the improved process of the present invention increases process flow efficiencies so that small fish, up to nine to eleven pounds in weight, can be processed for canning in an efficient, economical manner. Previously, by-products of the fish processing have been converted to fish meal and animal foods. The present invention permits the utilization of red or dark meat from trimmings, tails, bones and skin in a palatable nutritious food product acceptable for human consumption.

The preferred starting material is fresh or thawed tuna or tuna-like fish weighing about nine to eleven pounds. Both larger and smaller fish may be processed efficiently and economically, but due to increased fishing pressure of selected species, the average size of the preferred fish utilized by tuna canners, skipjack and yellowfin tuna, has been decreasing. The size of the fish is not intended to be limiting, but is merely suggested due to the availability of fish. Fish can be economically processed according to the present invention that weigh as little as one pound or as much as one hundred pounds.

In accordance with the present invention, the head and viscera of the fish are removed mechanically or manually depending on the size of the fish. For the sake of efficiency, this operation is preferably performed mechanically particularly on fish weighing eleven pounds or less. Additionally, the loins or fillets can be removed from the fish at this time. This step can be performed manually or by machine but the result is to produce loins or fillets of the white or light colored portions of the fish. The red meat portions of the fish particularly, the red meat found in the loin or fillet extending laterally through the loin parallel to the backbone of the fish, can be removed manually from the loin with a sharp knife. The red meat is trimmed off loin or fillet portions and separated. The loins are then skinned manually or by machine in such a manner to minimize cutting loss. The loins are then passed through a continuous cooker at a temperature sufficient to create an internal temperature of 47° C. to 66° C., preferably 55° C. to 58° C. for loins. The duration of cooking is dependent on the size of the loin. The loins are then cooled and cut or diced into fibrous bundles. With no intention to be unduly limitative, the loins may be diced so that the layers of fibers are in 1 cubic inch chunks of fish muscle. Alternatively, the loins may be cooked prior to the trimming of the red or dark meat.

The red or dark meat portions including the red meat from the trimmings from the light meat loin or fillets, skin, and carcass contain appreciable quantities of highly nutritious flesh but have a low commercial value when converted to fish meal or animal food because of the high content of bone and fat, the poor color and limited storage capacity. In accordance with the present invention, the above mentioned materials can be easily produced into a product acceptable for human consumption. These materials are subjected to mechanical bone removal methods. With no intention to limit the present invention, suitable methods of achieving separation of bone and other hard inedible material include a process where flesh is pressed through perforations in a drum, while leaving the bone. Deboning devices which utilize this process are manufactured by Beehive Machinery, Inc., Sandy, Utah and Nordischer Maschinenbau Rnd. Baader, Lubeck, Germany. Preferably, the carcass and skin are passed through the deboning device before the other materials. The bone residue is separated and made into bone meal or other by-products.

The fish obtained after removal of substantially all of the bone will usually be in the form of minced meat or finely divided fish muscle.

The minced meat or finely divided fish muscle is then restructured. The minced meat is mixed with an oil to facilitate restructuring and to provide a better mouthfeel. Optionally, about 1–20% unsaturated vegetable oil may be admixed with the minced meat. Preferably, however, a hydrogenated vegetable oil such as commercially available general purpose vegetable shortening or all purpose vegetable oil or shortening in a liquid or solid form at room temperature is used in amounts ranging from about 1 to about 3% by weight, more preferably about 1% by weight. With no intent to limit the invention, the hydrogenated vegetable oils are preferred to prevent any unnecessary unsaturated fat from reacting in subsequent decoloring steps utilizing hydrogen peroxide.

An important sequence of steps in the process of the present invention involves the restructuring and decoloring of the minced meat. However, prior to restructuring, the minced meat must be treated with a suitable heat stable red dye, such as FD&C #3. The heat stable dye is added to the minced meat before restructuring and decoloring to insure the proper color of the fish is maintained through the steps of restructuring, decoloring and retorting the meat product. Accordingly, an effective amount of any conventional heat stable red dye may be added to the minced meat to match the natural color of the fish, preferably tuna after retorting. Preferably, amounts ranging from about 10 to about 30 mg of the heat stable red dye are added to each kilogram of minced meat, preferably 20mg/kg.

As a flavoring aid, dried whole egg may optionally be added to the minced meat in an amount ranging from about 0.5% to about 2% by weight, preferably 1% by weight.

The minced meat mass is then subjected to plastic flow and sheeting to provide a coherent workable meat material that can be heat set, decolored and dewatered to resemble loin portions of fish. The term "plastic flow" as employed in the description of the present invention, can, therefore, be defined as the application of pressure to the minced meat mass to cause the tissue to flow together in a coherent, plastic mass. The minced meat mass should have a moisture content of about 50% to about 80% by weight. Preferably, the minced meat may be formed into a plastic sheet by passing it between smooth, parallel and adjacent rotating rolls.

Many mechanical devices are suitable for the formation of the minced meat into plastic flow sheets. Plastic flow sheeting can be accomplished conveniently by roll milling wherein one or more drums or rolls have differential or even speed movements and are equipped for heating and cooling. The rolls should be maintained at a temperature within the range of from about 175° F. to about 260° F. The temperature should be sufficiently high enough to cook or heat set the protein present in the minced meat.

The steam pressure within the rolls ideally should be within the range of from 5 psi to 35 psi. However, as those skilled in the art know, the exact roll peripheral speed, roll temperature and roll pressures depend upon the roll speed and the exact material which is to be sheeted and, therefore, can only be specifically determined under the exact conditions employed. However, it can be stated that generally in regard to pressure, the more pressure the tougher the fibrous meaty material which is ultimately formed. Preferably, the roll pressure should be within the range of from about 1 psi to about 5 psi to provide the desired texture and mouthfeel for the product. The roll speed should preferably be about 1 rpm to 5 rpm.

Sheet thickness of the minced meat should be from about ⅛ inch to 1/16 inch and preferably, from about 2/32 inch to about 3/32 inch. The rolls may be separated to provide a sheet thickness within these ranges to produce fibers of the desired strength and texture.

After sheeting, cooking or heat setting, the sheeted material may be placed in a hydrogen peroxide solution at an efficient time and temperature to promote decoloring. The pH of the solution should be in a range of 4.0 to 8.0, preferably 6.0 to 8.0. A food grade alkaline material such as sodium hydroxide may be utilized to adjust the pH. The material is immersed in the hydrogen peroxide solution for an effective time and at an effective temperature to obtain the natural color of loin meat of the fish. An arbitrary tuna color has been determined on a Gardner Colorimeter, manufactured by Gardner Labs, Inc., Bethesda, Md. 20014, a color reflectance meter to have an L value of 40 to 50 after retort cooking. The tuna color after decoloring should be about L=58. The rate of color lightening is a function of hydrogen peroxide concentration, temperature and time. The concentration of hydrogen peroxide may range from about 0.2 to 1% by weight hydrogen peroxide. After a one hour reaction time at room temperature with a 0.5% hydrogen peroxide would be suitable for obtaining a tuna color in the heat set extruded minced meat material. The same concentration of hydrogen peroxide at 50° C. would require a reaction time of about one-half hour.

The decolored material may be removed from the hydrogen peroxide solution and allowed to drain. The residual hydrogen peroxide can be removed by any standard technique which does not leave any deleterious matter in or on the fish. The hydrogen peroxide can be removed by water washing or by compressing lightly to squeeze out excess liquid. A preferred method is to contact the decolored fish with a dilute solution of catalase containing about 50 units/kgm of decolored minced meat material. The catalase can be easily removed by draining for the minced meat is dewatered to about a level of 30% solids, similar to the solids level of loin meat.

About 40% of the heat set, decolored minced meat may be mixed with about 60% of the diced loin meat. This ratio is variable and not intended to be limiting, the ratios of 80/20, 70/30, 60/40, 55/45, 50/50 and 45/55 produced acceptable and palatable canned tuna products. After combining of the loin and decolored minced meat, the mixture is canned and retorted in accordance with conventional procedures.

Accordingly, the process of the instant invention produces a decolored, restructured product that has the texture, flavor and aroma of loin portions of fish.

The following examples are for purposes of illustration and are not intended to be limiting. For example, various modifications may be made such as the use of other types of fish material and other types of extrusion comminuting and heat setting equipment.

EXAMPLE I

Thawed, skipjack tuna weighing 980 kilograms were mechanically butchered to yield fillets which were cooked at a temperature of 212° F. and cooled on a continuous belt cooker and then cleaned. The cooked, cleaned scrap was then mixed with the raw scrap meat from butchering and mechanically deboned in a Beehive deboner. This process yielded 271 kilograms of cooked loin and 224 kilograms of minced meat. The minced meat was then mixed while adding 4.48 kilograms of hydrogenated vegetable oil, 2.24 kilogram of dried whole egg and 4.48 grams of FD&C Red #3. The mixture was then introduced to the juncture of a Gouda 500 millimeter × 500 millimeter double drum dryer maintained at 30 psi steam pressure and rotating a 3 rpm at a surface temperature of 240° F. The drum spacing was practically ⅛ inch resulting in a sheet of structured material ⅛ inch thick. The material was then added to 400 liters of water at 65° C., to which 12 liters of 30% hydrogen peroxide had been added. After thirty minutes, the color was read on a Gardner Colorimeter as L=58.5. The material was then introduced to a catalase solution and held for thirty minutes. The removal of the peroxide was noted as the termination of gas bubbles eluting from the solution. The material was then allowed to drain, mixed with loin, diced, filled into cans and retorted. According to an expert taste panel, the product had the aroma, texture, mouthfeel, color and flavor of chunk light tuna.

EXAMPLE II

Thawed bonita weighing 15.7 kilograms were mechanically processed into loins and minced meat. The minced meat, including carcass, collar, trim and red meat pieces was mechanically deboned in a Beehive deboner. The loins were cooked for 10 minutes to an internal temperature of 55° C. The minced meat was mixed with 1% by weight of hydrogenated vegetable oil, 1% by weight dried whole egg and twenty milligrams of FD&C #3 red dye per kilogram of minced meat. The composite was then structured on a Gouda drum dryer at a steam pressure of 30 psi, and a temperature of 240° F. The drums were rotating at 3 rpm and spaced at ⅛ inch. The material was placed in a 5 liter water bath at 55° C., to which 0.15 liters of 30% hydrogen peroxide have been added. The material remained in a solution for sixty minutes. The restructured material had a color value of L=41.0 on a Gardner Colorimeter before decoloring and a value of L=66.03 after sixty minutes. The residual peroxide was then decomposed with catalase which was added in the amount of 15 units per kilogram and the excess water was drained. The restructured material was then mixed with the cooked loin, diced into 1″×1″×1″ pieces, canned and retorted.

EXAMPLE III

The procedure shown in Example II was followed with 12.7 kilograms of thawed Pacific mackerel. The Gardner Colorimeter reading before decoloring was L=41.0 and after decoloring was L=61.0.

EXAMPLE IV

Yellowfin tuna weighing 218.2 kilograms were mechanically processed into 80 kilograms of loins and 55 kilograms of minced meat. The loins were cooked on a continuous belt cooker at a temperature of 212° F. and minced meat was obtained by placing the carcass, collar, trim and red meat in a Beehive deboner. The minced meat was mixed with 2% by weight hydrogenated vegetable oil, 1% by weight dried whole egg and with twenty milligrams of FD&C #3 red dye per kilograms of minced meat. The mixture was then structured on a Gouda 500 millimeter ×500 millimeter double drum dryer at a teperature of 250° F., 35 psi per roll, at 4 rpm. The restructured material was then decolored in a 0.33% peroxide solution at 72° C. for thirty minutes. The resulting color on a Gardner Colorimeter was L=60. The residual peroxide was then removed with 50 units of catalase per kilogram of material. The resulting product was drained of excess water, mixed with the cooked loin, diced into pieces of 1″×1″×1″, filled into cans and retorted. According to an expert taste panel, the canned yellow fin tuna had the mouthfeel, aroma, texture, color and taste of chunk light tuna.

Having described the present invention with reference to the specific embodiments, it is to be understood that numerous variations may be made without departing from the spirit of the present invention. It is intended to accomplish such measurable variations or equivalents within the scope thereof.

What is claimed is:

1. A process for producing a fish product resembling in color fish having light colored loin meat comprising:
    comminuting red meat or dark portions of fish including trim, bellies, carcass and skin to form a minced meat mass,
    adding an effective amount of a heat stable dye such to produce the natural color of fish loin after retorting,
    forming the minced meat into a sheet providing a coherent plastic mass,
    heat setting or cooking the sheet of minced meat in a coherent plastic mass and decoloring the minced meat so that it resembles in color the loin portions of fish.

2. The process of claim 1 wherein the sheeted, decolored minced meat mass is combined with cooked, diced loin portions of fish.

3. The process of claim 2 wherein the sheeted, decolored minced meat is combined with loin portions of fish at a ratio of minced meat to loin meat selected from the group of ratios consisting of 80/20, 70/30, 60/40, 55/45, 50/50, 45/55, and 40/60.

4. The process of claim 1 wherein the minced meat is formed into a sheet of a coherent plastic mass by passing it between smooth, parallel and adjacent rotating rolls.

5. The process of claim 4 wherein the temperature of the rotating rolls is within the range of about 230° F. to 260° F.

6. The process of claim 4 wherein the rolls have a steam pressure within the range of 5 psi to 35 psi.

7. The process of claim 4 wherein the rolls have a speed of about 1 rpm to about 5 rpm.

8. The process of claim 1 wherein the moisture content of the minced meat is about 50 to about 80% by weight.

9. The process of claim 4 wherein the thickness of the minced meat upon exiting the rollers is about ⅛ inch to about 1/16 inch.

10. The process of claim 1 wherein the heat stable dye is applied to the minced meat in amounts ranging from about 10 to about 30 milligrams per kilograms of minced meat.

11. The process of claim 1 where the minced meat mass is mixed with about 1 to 20% by weight vegetable oil prior to sheeting.

12. The process of claim 1 wherein the minced meat mass is mixed with about 1% hydrogenated vegetable oil prior to sheeting.

13. The process of claim 1 wherein the sheeted coherent plastic minced meat mass is decolored by being immersed in an aqueous solution containing hydrogen peroxide at a level of about 0.2 to 1% by weight.

14. The process of claim 13 wherein the pH of the solution ranges from 6.0 to 8.0.

15. The process of claim 14 wherein the sheeted, decolored minced meat is dewatered to about 30% by weight solids level.

16. The process of claim 1 wherein fish is selected from the group consisting of tuna and tuna-like species.

* * * * *